United States Patent [19]
Reaves

[11] Patent Number: 5,368,912
[45] Date of Patent: Nov. 29, 1994

[54] PROTECTIVE COVER
[75] Inventor: Paul H. Reaves, Durham, N.C.
[73] Assignee: Reaves & Company, Inc., Durham, N.C.
[21] Appl. No.: 176,534
[22] Filed: Jan. 3, 1994
[51] Int. Cl.[5] .............................. B32B 9/00
[52] U.S. Cl. ..................... 428/192; 150/166
[58] Field of Search ......... 150/166; 428/192
[56] References Cited
U.S. PATENT DOCUMENTS
3,785,697 1/1974 Dabbs ................... 150/166
4,795,207 1/1989 Clarke .................. 150/166
4,951,993 8/1990 Taboada ................ 150/166

Primary Examiner—Patrick J. Ryan
Assistant Examiner—Kam Fong Lee
Attorney, Agent, or Firm—Olive & Olive

[57] ABSTRACT

A protective cover for covering vehicles or other objects comprises a rectangular sheet having both an elasticized perimeter and other elasticized portions which enable the cover to fit a wide range of vehicle or object sizes with which the cover is used to protect against paint or other environmental damage.

4 Claims, 3 Drawing Sheets

PROTECTIVE COVER

BACKGROUND OF THE INVENTION

1. Field of the Invention

This invention relates to protective covers and in particular to covers used to protect vehicles or other objects from environmental damage such as caused by paint spray or the like.

2. Description of the Related Art

A painter typically works near objects such as furniture, appliances, shrubbery, brick walks and the like which need to be adequately protected from accidental paint damage. The painter often drapes such objects with a flexible protective cover, such as an old cloth or plastic sheet, or a store bought paint drop cloth. A special problem arises at an office or commercial building paint job site when the painter is painting on a ladder or scaffolding extending a substantial distance up and adjacent an exterior wall and is painting immediately above parked vehicles. When the painter is painting with a paint brush or paint sprayer, small paint drops or paint spray may be released away from the painted surface and often fall on the parked vehicles beneath, thus damaging the vehicle's finish and likely angering the vehicle's owner. The painter or paint contractor may become responsible for the paint damage. A slight wind can carry the paint drops or spray to vehicles parked further away and thus expose the painter to additional damages.

Traditionally, painters have solved this problem by purchasing special vehicle covers that are elasticized around their perimeter edge. Conventional vehicle covers come in different sizes to fit different size vehicles. In use, the painter conventionally selects and places what the painter regards as an appropriate size vehicle cover over each vehicle to be covered and for each such cover slips the elasticized perimeter edge downwardly to hug the bottom portion of the vehicle. The elasticized perimeter edge is designed to prevent the conventional protective cover from slipping off or blowing off the vehicle in a wind. However, a small size protective cover if selected by the painter will not completely cover a big vehicle, and a big size protective cover if selected by the painter will not fit snugly to a small vehicle and in either case may stip or blow off, or may drape excessively upon the ground, causing a hazard to passerbys as well as exposing the vehicle to dirt and grime when the cover is removed. As a result, a painter must purchase a number of different size covers to fit the different size vehicles that may be located near the job site on any one day. Therefore, a painter or paint contractor must spend a significant sum of money to maintain an adequate supply of protective covers. In addition, an adequate supply of protective covers may take up an excessive amount of valuable storage space.

An additional problem with current protective covers is that a painter may misjudge the size of the vehicle and take a protective cover from storage, unwrap it, and attempt to cover a vehicle, only to find out that the protective cover is the wrong size. The painter will have to refold the cover, store it, and choose the right size. This wastes time, and exposes the cover to potential harm before actual use.

It is therefore an object of this invention to provide a single size protective cover that will fit many different size vehicles, thus reducing a painter's or paint contractor's expenses and required storage space while adequately protecting vehicles from paint damage.

It is also an object of this invention to provide a lightweight and inexpensive protective cover that will fit over different size objects other than vehicles and protect these objects from unwanted environmental exposure or damage.

Other objects will become apparent as the description proceeds.

SUMMARY OF THE INVENTION

A protective cover having a number of strategically placed elastic strips expands and contracts to fit different size vehicles or other objects. The protective cover is preferably made from a thin, air permeable, polypropylene sheet which in the described embodiments is approximately twelve feet wide and twenty four feet long. A first elastic band is permanently attached to the cover's perimeter edge. A second elastic band coincides with the cover's central longitudinal axis. The cover of the present invention is particularly adapted to protect different size vehicles from being splattered by paint from a nearby paint job-site.

DETAILED DESCRIPTION OF THE INVENTION AND PREFERRED EMBODIMENTS THEREOF

Figure 3:
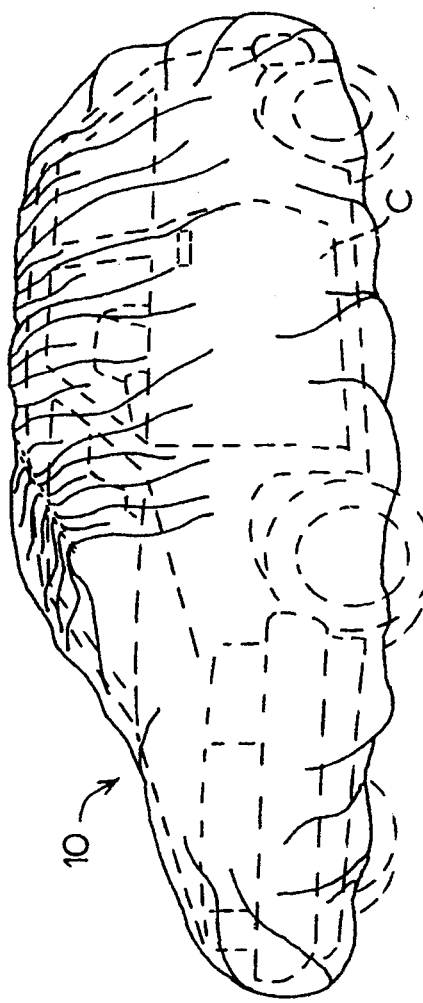
FIG. 3 is side view of a small car covered by the protective cover of the invention.
Figure 4:
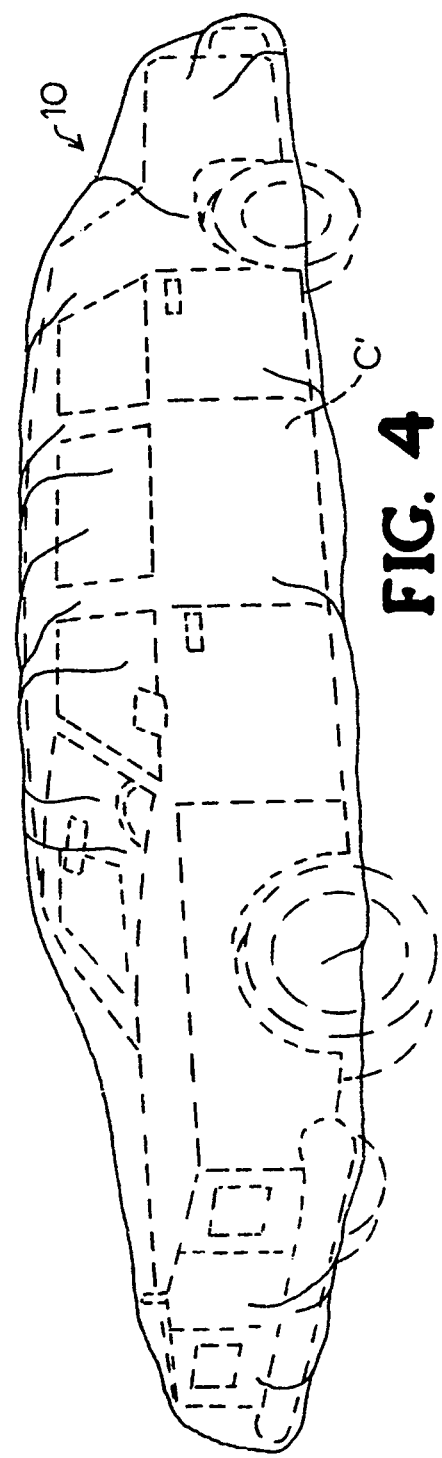
FIG. 4 is a side view of a large car covered by the protective cover of the invention.
Figure 5:
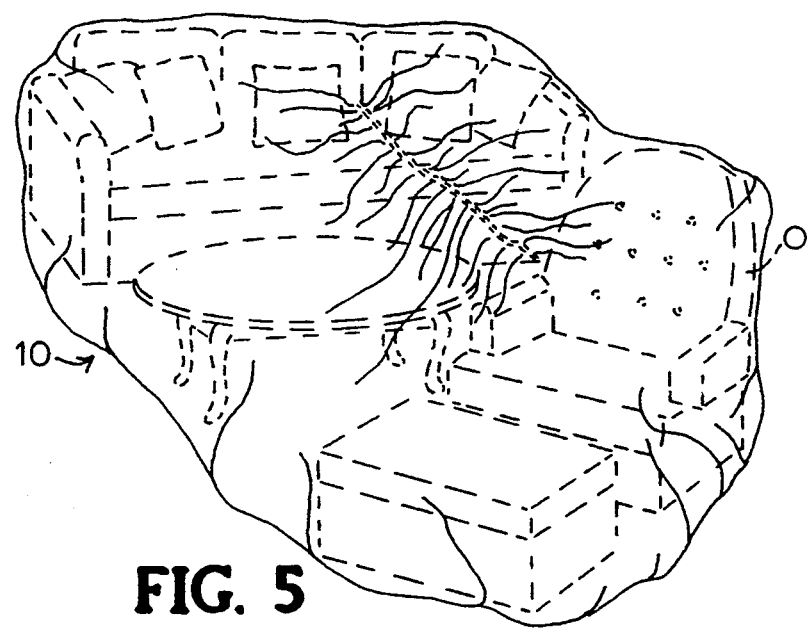
FIG. 5 is a side view of several pieces of furniture, indicated in dashed lines, covered by the protective cover of the invention.

According to the preferred embodiment, the present invention provides a protective cover 10 that expands and contracts to fit snugly around a range of small C and large C' size vehicles or other objects O to protect such vehicles or objects from environmental exposure or damage, as depicted in FIGS. 3, 4, and 5. The cover 10 is particularly adapted to cover different size vehicles to protect them from being splattered by paint from a painter working in close proximity to the vehicle. The protective cover of the invention can be made from a variety of natural or synthetic materials, including a variety of woven fabrics such as cotton sheeting or a variety of plastic sheeting. However according to a preferred embodiment, the protective cover 10 of the invention is made from an air permeable, nonwoven polypropylene sheet weighing 1.50 ounces per square yard and manufactured by Kimberly-Clark Corp. which has the advantage of being lightweight, inexpensive and resistent to condensation.

Figure 2:
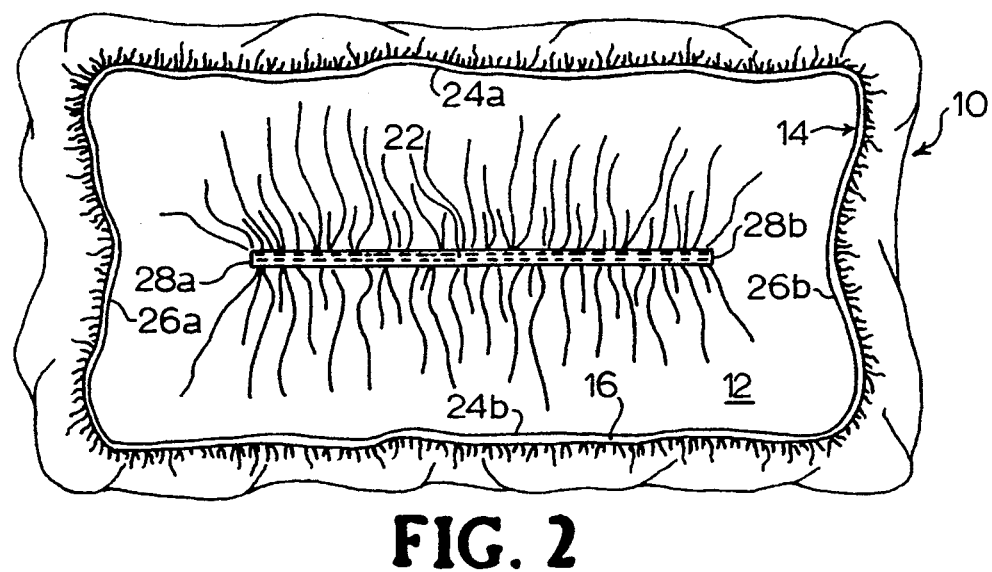
FIG. 2 is a bottom planar view of the cover of the invention shown in a relaxed condition.

Referring to FIG. 2 the protective cover 10 of the invention comprises a rectangular shaped polypropylene sheet 12 with a perimeter edge 14 including side edges 24a, 24b approximately 24 feet long each, and end edges 26a, 26b approximately twelve feet wide each. Protective cover 10 can be made from a single polypropylene sheet 12 of suitable width or from a pair or more of sheets of narrow width which are sewn or otherwise secured together to achieve the desired width.

A first elastic strip 16 which for the embodiment being described is approximately three-eighths inch wide and approximately thirty-six feet long, is sewn to and is located contiguous with the entire perimeter edge 14. The ratio of lengths of polypropylene sheet 12 to elastic strip 16 is 2:1, i.e. the first elastic strip 16 is stretched along the perimeter edge 14 and sewn thereto, such that the perimeter edge 14 is expandable and contractible between approximately seventy-two feet and thirty-six feet. In the embodiment being described, the first elastic strip 16 was sewn to the perimeter edge 14 using a Singer sewing machine, model 831-U, with 30-3 100% cotton thread and a single needle overlock stitch.

A second elastic strip 22 for the embodiment being described is one-half inch wide and ten feet long and is attached to cover 10 by sewing so as to coincide with the central longitudinal axis of the protective cover 10 as depicted in FIGS. 1, 2, 6, and 7. The ratio of polypropylene sheet 12 length to elastic strip 22 length is approximately 2:1, i.e. the second elastic strip 22 is stretched along the central longitudinal axis of the protective cover 10 such that the sheet fabric lying along the central longitudinal axis of the protective cover 10 is expandable and contractible between approximately fourteen feet and twenty-four feet. Elastic strip 22 in the described embodiment was sewn to cover 10 using a Singer 261 sewing machine with 100% polyester thread and a double needle straight stitch.

Figure 1:
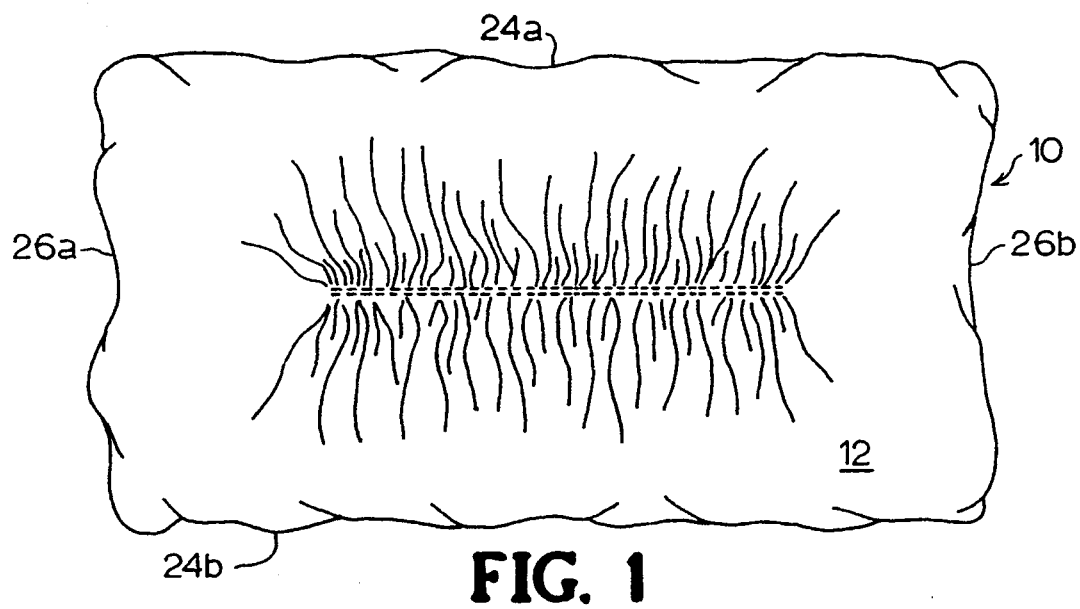
FIG. 1 is a top planar view of the protective cover of the invention shown in a relaxed condition.
Figure 6:
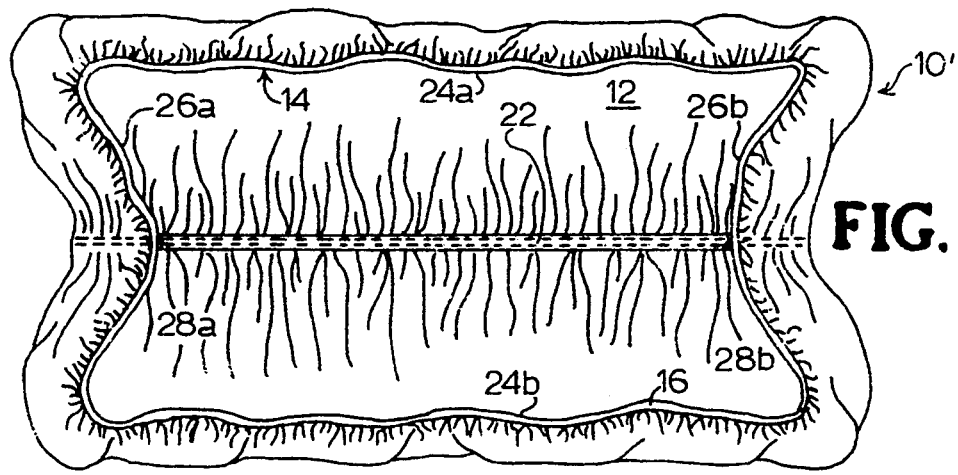
FIG. 6 is a bottom planar view of a protective cover according to a second embodiment of the invention and shown in a relaxed condition.
Figure 7:
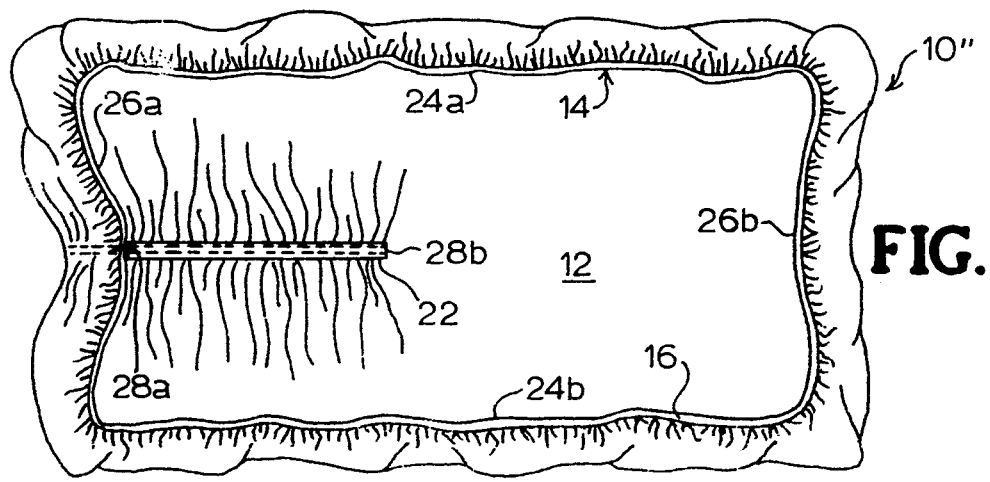
FIG. 7 is a bottom planar view of a protective cover according to a third embodiment of the invention and shown in a relaxed condition.

In the preferred embodiment elastic strip 22 terminates equidistant from end edges 26a, 26b, as depicted in FIG. 1. In a second embodiment, a single elastic strip 22 is sewn with its ends 28a, 28b contiguous with end edges 26a, 26b respectfully as shown in FIG. 6. In a third embodiment, elastic strip 22 is sewn with one end 28a or 28b contiguous with end edge 26a or end edge 26b as depicted in FIG. 7.

A prototype model of the invention cover made according to the first embodiment was found to work satisfactorily on vehicles ranging in length from approximately 12 feet in length to 22 feet in length.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. An expandable and contractible protective cover comprising:
   (a) a single thin, flexible, air permeable, rectangular sheet having a length and width corresponding to the length and width of the largest of a range of large and small size vehicles suited to being protected by said cover and having a continuous perimeter defined by side and end edges of said sheet;
   (b) a first continuous elastic strip of uniform width and of a length when relaxed which is substantially less than the length of the perimeter of said sheet, said first elastic strip being permanently attached to said perimeter in a manner permitting said perimeter to expand and contract in correspondence with the said range of large and small size vehicles over which said cover is fitted;
   (c) a second continuous elastic strip of uniform width and of a length when relaxed which is substantially less than the length of said sheet and permanently attached to one side of said sheet in a lengthwise extending location in which the longitudinal axis of said second elastic strip coincides with the central longitudinal axis of said sheet;
   (d) said cover when relaxed having width and length dimensions less than the width and length dimensions of the smallest of said range of vehicles to be covered; and
   (e) said strips adapting both the perimeter and central longitudinal portions of said sheet to expand and contract thereby enabling said protective cover to fit snugly around any of the said range of large and small size vehicles.

2. An expandable and contractible protective cover as claimed in claim 1 wherein each end of said second elastic strip terminates at a location spaced inwardly and at a uniform distance from a respective said end edge of said sheet.

3. An expandable and contractible protective cover as claimed in claim 1 wherein one end of said second elastic strip terminates at a location coinciding with one of the said end edges of said sheet and the other end of said second elastic strip terminates at a location spaced inwardly from the other of said end edges.

4. An expandable and contractible protective cover comprising:
   (a) a single thin, flexible, air permeable, rectangular sheet having a length and width corresponding to the length and width of the largest of a range of large and small size vehicles suited to being protected by said cover and having a continuous perimeter defined by side and end edges of said sheet;
   (b) a first continuous elastic strip of uniform width and of a length when relaxed which is substantially less than the length of the perimeter of said sheet, said first elastic strip being permanently attached to said perimeter in a manner permitting said perimeter to expand and contract in correspondence with the said range of large and small size vehicles over which said cover is fitted;
   (c) a second continuous elastic strip of uniform width having each end thereof attached to said sheet at a location coinciding with a respective end edge of said sheet and permanently attached to one side of said sheet in a lengthwise extending location in which the longitudinal axis of said second elastic strip coincides with the central longitudinal axis of said sheet;
   (d) said cover when relaxed having width and length dimensions less than the width and length dimensions of the smallest of said range of vehicles to be covered; and
   (e) said strips adapting both the perimeter and central longitudinal portions of said sheet to expand and contract thereby enabling said protective cover to fit snugly around any of the said range of large and small size vehicles.

* * * * *